United States Patent Office 3,520,874
Patented July 21, 1970

3,520,874
PROCESS FOR THE PRODUCTION OF A FINE POROUS FILM
Wataru Ueno and Hideo Kawaguchi, Kanagawa, Japan, assignors to Fuji Shashin Film Kabushiki Kaisha, Kanagawa, Japan
No Drawing. Filed Oct. 6, 1967, Ser. No. 673,262
Claims priority, application Japan, Oct. 7, 1966, 41/66,096
Int. Cl. C08b 3/22, 29/10
U.S. Cl. 260—230          7 Claims

ABSTRACT OF THE DISCLOSURE

Method for the production of cellulose acetate film having fine pores and improved strength comprising, first, swelling a porous cellulose acetate film with an organic solvent and then hydrolyzing the film.

BACKGROUND OF THE INVENTION

Field of the invention

The present invention relates to a process for the production of a fine porous film. More particularly, it is concerned with a process for the production of a fine porous film having a larger film strength and a smaller pore size than the porous cellulose acetate film made by known methods from cellulose acetate, and being insoluble in organic solvents.

Description of the prior art

Since porous films consisting of cellulose acetate are generally fragile and soluble in organic solvents, they should be handled with the utmost care. In particular, in using them for filtering they must be handled carefully, and solvents used in such procedures are limited to water or especially selected organic solvents. Therefore, available filter films of this type for use in filtering an organic solvent solution are stored in non-solvents. It is then necessary, at use, to immerse the film successively in a series of liquids in such an order that the film is accustomed to the working solvent.

Therefore, the principal object of the invention is to provide a fine porous film capable of being dried or stored, and being ready for use without any preparatory film treatment.

SUMMARY OF THE INVENTION

In accordance with the invention, there is provided a process for the production of a fine porous film, which is characterized by swelling a porous cellulose acetate film with an organic solvent and then hydrolysing it.

DETAILED DESCRIPTION OF THE INVENTION

The porous cellulose acetate film which is obtained by subjecting cellulose acetate to film making is first swelled with an organic solvent miscible with water and is then hydrolysed with an aqueous alkaline solution. As the organic solvent, a solvent capable of swelling cellulose acetate may be used alone or in a mixture with water, or a mixed solvent of a cellulose acetate-dissolving solvent and water or alcohol to reduce the dissolving property thereof may be used. Any one or a mixture of solvents capable of swelling a film to some extent and causing an alkaline solution to permeate uniformly through the film may be used. For example, methyl alcohol, ethyl alcohol and their mixtures with water, methyl ethyl ketone, acetone and mixed solution of dioxane and water are suitable. As the alkali, sodium hydroxide, potassium hydroxide, calcium hydroxide or ammonia may be used in the form of an aqueous solution. The hydrolysing time can be shortened by increasing the concentration of the solution. In the case of a small concentration, a long reaction time or heating is required. The conditions of hydrolysing depend on the object, but a concentration of 0.1 to 2 N is ordinarily desired. The fine porous film, after hydrolysing, is washed with water, dried and stored, the drying being omitted in some cases.

The fine porous film of the invention is insoluble in a solvent of cellulose acetate, such as, acetone or methylene chloride and makes it possible to filter a solution containing an organic solvent as well as an aqueous solution. The pore size of the fine pores decreases due to shrinkage of the whole film, the strength of the film itself being thereby increased.

The fine porous film of this invention may be used, e.g., as a filter for various purposes and as porous films for electrophoresis or chromatography.

The invention will be further illustrated by the following example, in which the concentration is to be taken as a proportion by weight.

EXAMPLE

A solution consisting of 3 parts of cellulose diacetate (bonded acetate: 55%), 3 parts of cellulose triacetate (bonded acetate: 60%), 60 parts of methylene chloride, 28 parts of methyl alcohol, 2 parts of triacetin and 4 parts of water was subjected to film making in the conventional manner and the resulting porous cellulose acetate film was heated at 50° C., for 30 minutes in a mixed solution of 65 parts of ethyl alcohol and 35 parts of water. To the solution was then added an aqueous solution of 0.5 N sodium hydroxide, and the solution was heated at 50° C., for 30 minutes, followed by washing with water. The thus processed film was tensioned by a frame and dried at 100° C., for 1 hour. The properties of the film before and after hydrolysing are shown in the following table.

|  | Before hydrolysing | After hydrolysing |
|---|---|---|
| Film thickness | $135\mu$ | $97\mu$. |
| Pore diameter | $1.0\mu$ | $0.7\mu$. |
| Solubility in organic solvent. | Soluble readily in acetone, methyl acetate or ethylene dichloride. | Insoluble in acetone, methyl acetate or ethylene dichloride. |
| Elongated to break | 4% | 10%. |
| Breaking strength | 1.40 kg./mm.² | 3.25 kg./mm.² |

What is claimed is:
1. A method for the production of a solvent-insoluble, fine porous cellulose acetate film comprising the steps of
   (a) swelling a porous cellulose acetate film with a member selected from the group consisting of an organic solvent capable of swelling cellulose acetate and a mixture thereof with water, and
   (b) thereafter hydrolysing the swelled cellulose acetate film in a medium consisting of an aqueous alkaline solution.

2. The method of claim 1 wherein said aqueous alkaline solution has a concentration of from about 0.1 to 2.0 N.

3. The method of claim 1 wherein said organic solvent is selected from the group consisting of methyl and ethyl alcohol and mixtures of said alcohols with water.

4. The method of claim 1 wherein said organic solvent is selected from the group consisting of methyl ethyl ketone and acetone.

5. The method of claim 1 wherein said organic solvent is a mixed solution of dioxane and water.

6. The method of claim 1 wherein the aqueous alkaline solution is an aqueous solution of a member selected from the group consisting of sodium hydroxide, potassium hydroxide, calcium hydroxide, and ammonia.

7. The method of claim 1 wherein said member is selected from the group consisting of acetone, methyl ethyl ketone, methyl alcohol, ethyl alcohol, dioxane, a solution of methyl alcohol and water, a solution of ethyl alcohol and water and a solution of dioxane and water.

References Cited

UNITED STATES PATENTS

| | | | |
|---|---|---|---|
| 1,061,771 | 5/1913 | Mork | 260—230 |
| 1,984,416 | 12/1934 | McNally et al. | 260—230 |
| 2,058,574 | 10/1936 | Dreyfus | 260—230 |
| 2,106,297 | 1/1938 | Dreyfus | 260—230 |
| 2,139,664 | 12/1938 | Bley | 260—230 |
| 2,824,779 | 2/1958 | Reeves et al. | 260—230 |
| 2,900,669 | 8/1959 | Booth | 106—196 |
| 3,153,105 | 10/1964 | Haas | 260—230 |
| 2,843,583 | 7/1958 | Voris | 106—196 |

DONALD E. CZAJA, Primary Examiner

R. W. GRIFFIN, Assistant Examiner

U.S. Cl. X.R.

106—196; 204—180